Figure 1:
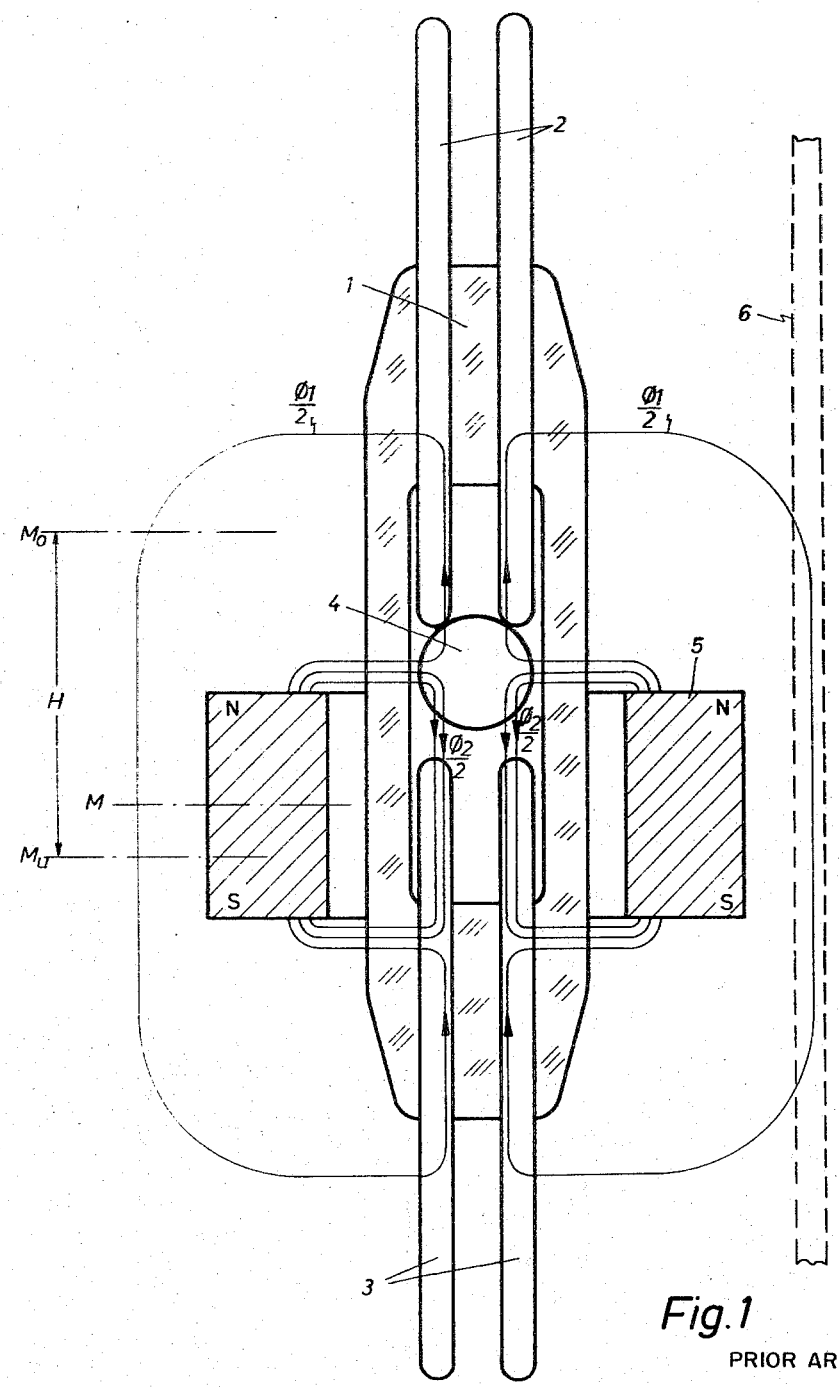

United States Patent Office 3,356,948
Patented Dec. 5, 1967

3,356,948
ELECTRICAL SWITCHING UNIT, CONTROLLED THROUGH PERMANENT MAGNETS WITH A REED CONTACT, HAVING A FREELY MOVABLE ARMATURE
Andreas Zerfass, Stuttgart-Stammheim, Germany, assignor to International Standard Electric Corporation, New York, N.Y., a corporation of Delaware
Filed July 6, 1966, Ser. No. 563,186
Claims priority, application Germany, July 30, 1965, St 24,201
3 Claims. (Cl. 335—153)

The invention relates to an electric switching device, controlled through permanent magnets, having a reed contact with freely movable armature, and particularly to a pressure-type or pulling-type key with a reed contact having the shape of a ball.

Pressure-type and pulling-type keys are known which use contacts enclosed in reed tubes instead of a bare spring set pack and in which the contacts are actuated by permanent magnets moved in the direction of pressing the key. Besides the hitherto known type of keys with reed armature contacts of the blade-type, which require very much space, particularly in the longitudinal direction, the United States Patent No. 3,289,129 proposes to equip such pressure- and pulling-type keys with reed armature contacts, having the shape of a ball, which can be operated, depending on the number to be switched, with permanent magnets poled in different directions, so that a snapping effect is obtained. At a construction of this arrangement known the ball-type armature is controlled by a toroidal or ring magnet, poled in the axial direction and enclosing the reed tube. This construction, however, shows the draw-back of a small interrupting force of the ball-type armature. The flux of the ring-shaped magnet namely is subdivided into two partial fluxes $\phi_1$ and $\phi_2$, whereby the partial flux $\phi_2$ tends to move the ball-type armature towards the opposite located pair of contacts, while the partial flux $\phi_1$ tends to keep the ball-type armature at the operating pair of contacts. The actual, relatively small interruption force therefore results from the difference of both partial fluxes $\phi_2 - \phi_1$. This force is further reduced, if an external interfering field, passing in the same direction, is superimposed on the flux $\phi_1$. Shielding of the interfering field by a shielding metal sheet alone is not effective, although the external field is kept off the contacting point, because the shielding improves the flux path of flux $\phi_1$, thereby increasing said flux $\phi_1$.

It is a primary object of the invention to increase the interrupting force of the armature freely movable in a reed contact, controlled by permanent magnets in electrical switching devices, particularly with pressure-type and pulling-type keys with ball-type reed contacts. At the same time shielding from external interfering fields should be possible. This is achieved according to the invention by permanent magnets, associated with the ring-shaped magnet, controlling the armature, the holding flux and the moment of switch-over is compensated.

According to an embodiment of the invention another axially poled toroidal magnet, enclosing the reed tube, is arranged on either side of the toroidal magnet, controlling the armature.

According to a further embodiment of the invention the reed contact and the permanent magnet are protected against external interfering fields by shielding.

The switching arrangement according to the invention shows various advantages. It is possible with this arrangement, for example, to increase the interrupting force of the ball-type armature in pressure- and pulling-keys equipped with such ball-type reed contacts and to reduce the sensitivity against external interfering fields, because, due to the compensation magnets according to the invention shielding-off against interfering fields makes sense again. Moreover, not only reed contacts with ball-shaped armature can be used in switching arrangements according to the invention, but all other reed contacts known with freely borne armature, which can be constructed either cylindrical or like a piston, for example.

Figure 2:
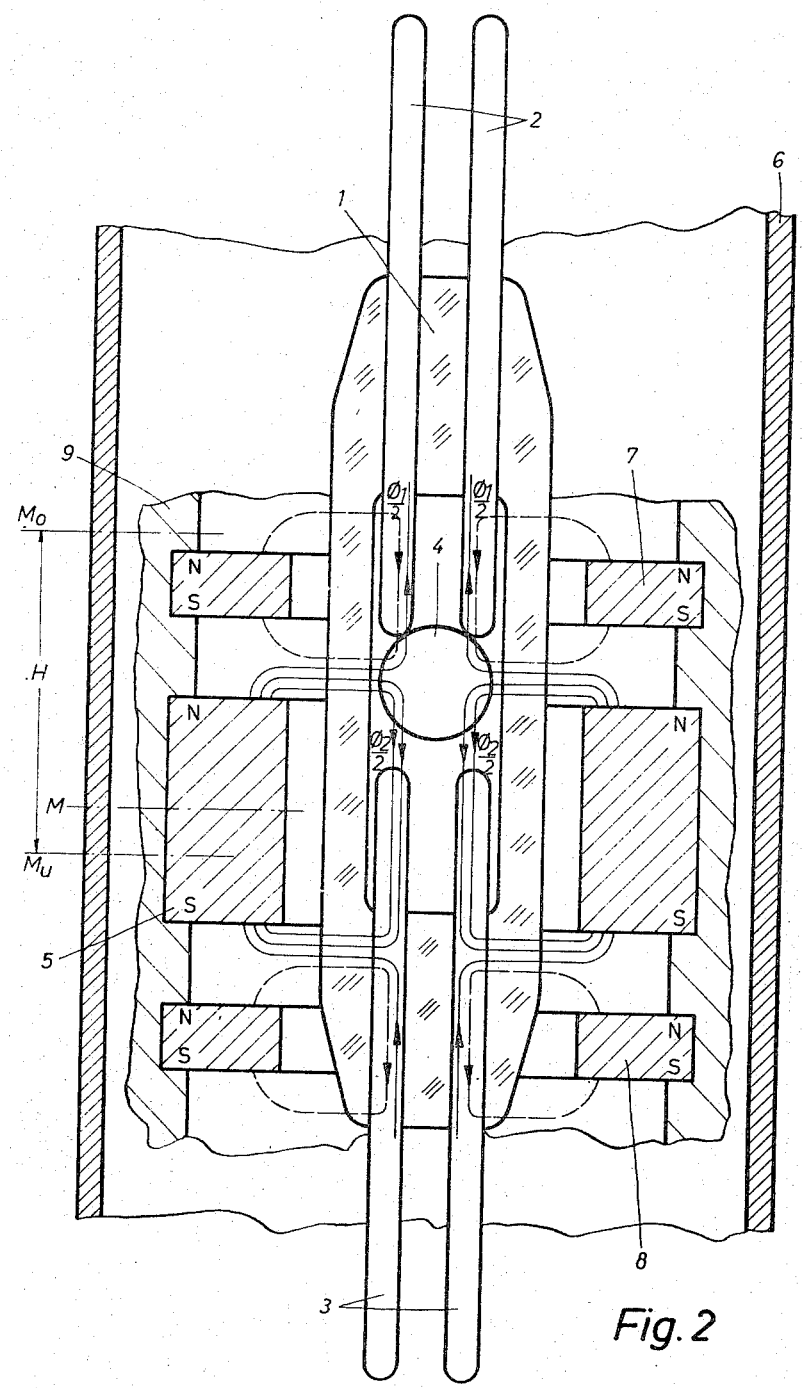

The invention is described with the aid of an example. The accompanying drawings show:

In FIG. 1 a sectional view of a ball-type reed contact of known type with a toroidal magnet controlling the armature, as used with pressing- and pulling keys, FIG. 2 shows a sectional view of key with ball-type reed contact and two permanent magnets, according to the invention, associated with a toroidal magnet controlling the armature.

FIG. 1 indicates the reed tube 1 in the opposite ends of which a pair of contacts 2 and 3 are melted in. Between the contact ends of the pair of contacts 2, 3 the ball-shaped armature 4 is arranged. The toroidal magnet 5 is moved in the longitudinal direction of the reed tube 1 thus controlling the ball-type armature 4. In the position shown on the drawing the toroidal magnet 5 has passed through approximately ¾ of the lift. This approximately corresponds to the position at which the ball-type armature switches over. M indicates the centre of the toroidal magnet, the lift H shows the path between its top final position $M_o$ and its bottom final position $M_u$. The drawing shows that the flux of the toroidal magnet is divided into two partial fluxes $\phi_1$ and $\phi_2$, whereby the latter partial flux tends to move the ball-type armature 4 towards the pair of contacts 3, while the partial flux $\phi_1$ urges the ball-type armature 4 towards the pair of contacts 2. Therefrom results a relatively small interruption force of the ball-type armature 4 from the difference $\phi_2 - \phi_1$. The drawing shows, moreover, that in this arrangement a shielding against external interfering fields is impractical if not impossible. A shielding 6, for example, would improve the path of the flux $\phi_1$ and further reduce the interrupting force of the ball-type armature 4.

FIG. 2 shows an arrangement used for keys according to FIG. 1 with the permanent magnets 7 and 8, associated with the toroidal magnet 5 according to the invention. These permanent magnets are firmly connected with the toroidal magnet 5 through a suitable fixing 9 and are moved, together with it, in the direction of keying. The flux of the permanent magnets 7 and 8 increases the interrupting force of the ball-type armature 4, because said flux compensates the partial flux $\phi_1$ at the respective contacting point. The permanent magnet 7 compensates the flux $\phi_1$ in the position shown on the drawing (¾ of the route of the key) at the pair of contacts 2. The permanent magnet 8 effects the same compensation at the pair of contacts 3 when the key is actuated in opposite direction. If such an arrangement of magnets 5, 7, 8 is used a shielding 6 against external interfering fields makes sense again, provided that the partial flux $\phi_1$ is completely compensated by the permanent magnets 7 and 8, respectively.

While the principles of the invention have been described above in connection with specific apparatus and applications, it is to be understood that this description is made only by way of example and not as a limitation on the scope of the invention.

What is claimed is:
1. An electric switching unit comprising
   a pair of reed contacts,
   a freely borne armature capable of closing an electric circuit through said reed contacts,
   an annular permanent magnet producing flux, a first part of said flux linking with said reed contacts and said freely borne armature to enable said annular magnet to move said armature into and out of contact with said reed contacts, a second part of said flux linking with said reed contacts and said freely borne armature tending to oppose motion of said armature out of contact with said reed contacts, and a pair of permanent magnets magnetically coupled to said annular permanent magnet, said pair of permanent magnets providing additional flux compensating for the second part of said flux and thus providing improved performance during periods when the armature switches out of contact with the reed contacts.

2. An electric switching arrangement substantially as claimed in claim 1, in which the pair of permanent magnets are toroidal and one is located on either side of the annular permanent magnet, said pair of permanent magnets being poled in the axial direction.

3. An electric switching arrangement substantially as claimed in claim 1, in which the reed contacts and the permanent magnets are enclosed in a shield for protection from external interfering fields.

References Cited

UNITED STATES PATENTS

| | | | |
|---|---|---|---|
| 3,261,942 | 7/1966 | Wessel | 335—154 |
| 3,270,302 | 8/1966 | Wessel | 335—154 |
| 3,289,129 | 11/1966 | Wessel | 335—153 |

BERNARD A. GILHEANY, *Primary Examiner.*

R. N. ENVALL, JR., *Assistant Examiner.*